United States Patent Office 3,219,576
Patented Nov. 23, 1965

3,219,576
METHOD OF CLARIFYING NIGHT SOIL
WITH BACTERIA
Tomitaro Makabe, 2456 Niimi, Okayama
Prefecture, Japan
No Drawing. Filed Apr. 20, 1962, Ser. No. 188,976
1 Claim. (Cl. 210—11)

This invention relates to methods for treating material with beneficial bacteria, and more particularly to a method for treating night soil with certain bacteria of the genus Vibrio and the present application is a continuation-in-part of my co-pending application for United States patent Serial No. 60,770, filed October 6, 1960, for Method of Clarifying Night Soil With Bacteria, and now abandoned.

An important object of the invention is to provide methods for the treatment of night soil in water with certain bacteria of the genus Vibrio for the expeditious clarification thereof, which methods require about forty-five days for clarification as compared with the ordinary methods which generally take ninety days.

Another important object of the invention as mentioned above is the provision of methods for the culture of certain bacteria of the genus Vibrio which methods render the bacteria especially useful for the clarification of night soil in water.

While bacteria of the genus Vibrio are quite common in raw waters, along with other bacteria, both harmless and harmful to humans, the clarification of such night soil containing waters, particularly when the night soil content is relatively large, is generally very slow, complicated and sometimes haphazardous as to results. In the contrary, my methods, after thorough tests as to results, are relatively quick, simple and sure, and the cost is especially low.

Other objects and advantages of the invention will be apparent during the course of the following detailed description of my invention.

The bacteria of the genus Vibrio which are used in my methods herein disclosed are the species *V. ghinda* Pfeiffer, *V. percolans, Cellvibrio fulvus* and *Cellvibrio vulgaris* (as especially extracted from among the Vibrio belonging to the Cellvibrio). Where the terms Vibrio of this invention is used in this specification, the Vibrio just named are meant, except where Vibrio may be qualified as to other species.

My preferred method for the treatment of night soil comprises the following steps:

(1) A separation medium is prepared, which I will term "Medium A," consisting of the following compositions of matter in substantially the mass specified, and mixed together as by stirring:

| | Gms. |
|---|---|
| Peptone | 10.0 |
| Sodium chloride | 3.0 |
| Yeast essence | 5.0 |
| Magnesium sulfate | 0.2 |
| Calcium chloride | 0.2 |
| Potassium phosphate | 1.5 |
| Potassium dihydrogen phosphate | 4.5 |
| Saccharose | 5.0 |
| Dextrin | 0.2 |
| Sodium Sulfite | 3.0 |
| Sodium thiosulfate | 1.0 |
| Agar | 15.0–18.0 |

To substantially 1000 cc. distilled water are added, with stirring, the above-named compositions of matter, and a substantially 10% sodium carbonate-sodium hydroxide solution in order to provide a solution of substantially pH 8.5 which is then sterilized at a pressure of substantially 1.05 mm. for about 15 minutes and the hot solution is introduced into a sterilized container, as petri dish, and allowed to cool, thus providing Medium A.

To Medium A is added water containing bacteria usually found in the raw waters of rivers, streams, ponds, lakes and the like. Such waters almost always contain Vibrio of the species of Vibrio of this invention, and may also contain Vibrio harmful to human life. The addition may be substantially 2 mg. and may be introduced by the use of a platinum loop. However, this weight is given by way of example and may be slightly less or more.

The bacteria-containing Medium A is maintained at a temperature of substantially 34° C. for 24 to 40 hours (or even longer than 40 hours, such as for 4 days). This treatment will enable a skilled operator to recognize the Vibrio of this invention from other bacteria in the bacteria-containing Medium A. The Vibrio of this invention will form colonies, separate from those of other bacteria. They may be recognized even from such Vibrio as that of the species *V. cholerae*, since, while Vibrio generally give the cholera-red or nitrosoindole reaction in a nitrate-peptone water culture and usually ferment surcose and mannose, the Vibrio of this invention do not ferment arabinose as do *V. cholerae*.

A modified step 1 may be introduced after the completion of steps 1 and 2 by recycling substantially 2 mg. of the produce of step 2 back into a newly-prepared Medium A and treating the recycled Vibrio as in step 1, to be followed by steps 2 and 3 to be next detailed.

(2) After the completion of step employing Medium A, the Vibrio are introduced to a second or pure culture-providing medium, which will be designated as "Medium B." This Medium B may be prepared from the following compositions of matter:

| | Gms. |
|---|---|
| Peptones | 20.0 |
| Sodium chloride | 3.0 |
| Yeast essence | 5.0 |
| Magnesium sulfate | 0.2 |
| Calcium chloride | 0.2 |
| Potassium nitrate | 1.0 |
| Potassium phosphate | 1.4 |
| Potassium dihydrogen phosphate | 4.5 |
| Sodium pyrophosphate | 1.0 |
| Sodium thiosulfate | 1.0 |
| Potassium ferrocyanide | 1.0 |
| Sodium glutamate | 0.5 |
| Casitone (pancreatic digest of casein) | 5.0 |
| Succinic acid | 0.5 |
| Manganese sulfate | 0.01 |
| Ferric oxide sulfate | 0.1 |
| Agar | 18.0 |

After mixing the compositions of matter, as by stirring, there is added to the mixture substantially 1,000 cc. distilled water and substantially 1.0 cc. of a 20% solution of cobalt chloride, with stirring.

The solution is rendered weakly-basic by the addition of a substantially 10% solution of sodium carbonate-sodium hydroxide, and vapor pressured at about 105 mm. atmospheric pressure for about 15 minutes and substantially 1 liter thereof put into a sterilized test tube before it cools, with the tube tipped in order to provide an inclined fluid surface while cooling. This provides Medium B.

To the Medium B is added about 2 mg. of the culture of Vibrio, substantially all of the Vibrio of this invention, as by the use of a platinum loop. Cultivation of the Vibrio in Medium B is continued at approximately 34° C. for about 24 hours. The Vibrio therein will be fixed therein biochemically and confirmation thereof may be made, as is well known in the art. The pure culture in the tube will be found to be one or more of the Vibrio of this invention.

(3) A third medium is now prepared which will be termed "Medium C" and is a bacteria multiplying medium. It comprises:

| | Gms. |
|---|---|
| Peptone | 20.0 |
| Yeast essence | 5.0 |
| Sodium chloride | 3.0 |
| Potassium nitrate | 1.0 |
| Magnesium sulfate | 0.2 |
| Calcium chloride | 0.2 |
| Potassium phosphate | 1.5 |
| Potassium dihydrogen phosphate | 4.5 |
| Potassium ferrocyanide | 1.0 |
| Sodium citrate | 3.0 |
| Casitone | 5.0 |
| Sodium glutamate | 0.2 |
| Sodium thiosulphate | 1.5 |

These compositions of matter are preferably added to substantially 1,000 cc. distilled water in a sterilized glass container and a solution of 10% sodium carbonate-sodium hydroxide is added in order to provide substantially a pH 8.5. Atmospheric pressure at substantially 105 mm. for about 15 minutes is applied, and subsequent cooling to room temperature completes the provision of "Medium C."

Into substantially 1 litre of Medium C is introduced Vibrio from the Medium B (as by the platinum loop method) of substantially 2 mg., and culture is carried on at a temperature of about 34° C. for 4 to 5 days, whereupon the Vibrio culture is ready for use for the clarification of night soil in water.

(4) Night soil is treated with the Vibrio resulting from step 3 preferably as follows:

The night soil is filtered, as through a conventional mesh screen, so that such material, as paper, is removed thereby and, to the filtrate, is added water in a volume proportion of between 30% and 40% of the bulk of the filtrate, whereupon the solid matter in the aqueous filtrate may be crushed and the crushed matter stirred until the particles of solid matter are reduced to about the size of grains of rice.

The aqueous crushed filtrate may then be temporarily stored in a tank for a night. The contents will then be at a pH 8.5 or thereabouts.

The stored filtrate is then introduced to a diaphragmed clarification tank of conventional build, with overflow channels. The tank may be of concrete. Provision is made for the introduction in any conventional way of oxygen (of the air) into the contents of the tank, and the need for stirring of the contents may be met also in any conventional way, since both of these operations are well known in connection with water clarification practices.

To a filtrate containing substantially 4 tons (either long or short tons) night soil, is added 4 grams of the Vibrio derived from step 3.

The Vibrio-treated filtrate is allowed to remain in the first clarification tank and then drawn into another or other conventional clarification tanks for treatment, including oxygen introduction (such as twice daily for an hour) stirring.

Clarification is accomplished in substantially 45 days by my method as compared to substantially 90 days by conventional methods.

The species of Vibrio employed will grow and multiply under temperatures of 7° C. to 37° C., so that provision should be made to insulate the contents, if necessary in order to prevent a drop in temperature below 7° C.

I have discovered that night soil may be treated by my method in tonnage as shown by the following table:

Table I

| Night soil secreted from presumably: | Quantity of cultured bacteria, g. |
|---|---|
| 4 tons (5,000 persons) per day | 4 |
| 8 tons (10,000 persons) per day | 6 |
| 40 tons (50,000 persons) per day | 10 |

| Night soil: | Volume of cultured liquid per one time, l. |
|---|---|
| 4 tons (5,000 persons) | 10 |
| 8 tons (10,000 persons) | 12 |
| 40 tons (50,000 persons) | 25 |

Progressive clarification takes place, tank-by-tank, substantially as shown in the next table:

Table II

| Classification of tank | Time (in days) in tank of night soil calculated from effective volume of tank | Reduced ratio of COD, percent | Reduced ratio of BOD, percent | Reduced ratio of Al-N, percent | Averaged reduced ratio, percent |
|---|---|---|---|---|---|
| 1 | 30 | 86.2 | 82.0 | 84.5 | 84.2 |
| 2 | 13 | 89.0 | 84.1 | 86.4 | 86.5 |
| 3 | 13 | 90.7 | 84.5 | 88.1 | 87.8 |
| 4 | 3 | 91.5 | 85.5 | 89.5 | 88.8 |
| 5 | 3 | | | | |
| 6 | 7 | 92.8 | 87.7 | 91.0 | 90.5 |
| 7 | 7 | 94.3 | 89.8 | 92.2 | 92.1 |
| 8 | 7 | | | | |
| 9 | 7 | 95.9 | 92.1 | 94.1 | 94.0 |

COD: Chemical Oxygen Demand per 4 hours.
BOD: Biochemical Oxygen Demand (for five days).
Al-N: Albuminoid Nitrogen.

As shown in the above table 84.2% of contained night soil are clarified and decomposed in the first tank, and further this clarification is continued until 94% of the same are decomposed in the last tank. Though a precipitate collects filths at the bottoms of the first tank, but the third tank (which is provided with conventional stirring apparatus) has never required precipitate evacuation for 2 years, and the quantity of the precipitate has but little increased.

The quantity of ammonia and hydrogen sulfide, the last products, which are produced in decomposition of protein hardly changes in each chamber. The pH is kept at between 8.4–8.6 in each chamber, (this range is the most efficient for increasing the species employed of the Vibrio group). The result of microbiological test shows that the Vibro is found notably in the tank from the first to the last chambers.

The clarified liquid which flows from the chamber of the last tank is clarified water, presenting a light yellow-brown color. Then the same is diluted with 10–20 times its volume with clear water, thereafter filtered through the conventional distributed filter of the filtration plant trickling filter after settlement takes place in the final precipitating pond or reservoir, the upper depth of liquid is drawn off gradually.

If there is any buffer action in the mediums, the species employed of the Vibro group can exist with the pH thereof between 5.6 and 9.5, however the most suitable pH for them is that of about 8.5 and in order to control the culture medium at pH 8.5, and added solution of 10% sodium carbonate and sodium hydroxide is preferably used.

The bacteria of the named species of the Vibro group is remarkably affected by the pH in the morphological point and these species, existing in a solution of less than pH 7.6 is present as coccus, but on the contrary, the same existing in a solution of more than pH 8.5, grows into relatively large bacillus. The Vibro group is, of course, an alkaliphilus and is gram-negative.

An alternate method contemplates the use of clarified water, resulting from the carrying out of steps 1, 2 and 3, and clarification of the night soil in water as described. This clarified water contains the harmless Vibrio of this invention and this clarified water with its Vibrio content may be reintroduced to Medium A, and step 1 again followed, whereupon steps 2 and 3 may be repeated, with the product resulting from this second step 3 employed for clarification purposes as described above.

I claim:

Method of clarifying night soil which method consists in preparing three separate mediums, substantially as in A, B and C, as below:

| Composition of Matter | Medium | | |
|---|---|---|---|
| | A Grm. | B Grm. | C Grm. |
| Peptone | 10.0 | 20.0 | 20.0 |
| Sodium chloride | 3.0 | 3.0 | 3.0 |
| Yeast essence | 5.0 | 5.0 | 5.0 |
| Magnesium sulfate | 0.2 | 0.2 | 0.2 |
| Calcium chloride | 0.2 | 0.2 | 0.2 |
| Potassium phosphate | 1.5 | 1.4 | |
| Potassium dihydrogen phosphate | 4.5 | 4.5 | 4.5 |
| Saccharose | 5.0 | | |
| Dextrin | 0.2 | | |
| Sodium sulfite | 3.0 | | |
| Sodium thiosulfate | 1.0 | 1.0 | 1.5 |
| Agar | 15.0–18.0 | 18.0 | |
| Potassium nitrate | | 1.0 | 1.0 |
| Potassium phosphate | | 1.4 | 1.5 |
| Sodium pyrophosphate | | 1.0 | |
| Potassium ferrocyanide | | 1.0 | 1.0 |
| Sodium glutamate | | 0.5 | 0.2 |
| Casitone (pancreatic digest of casein) | | | 5.0 |
| Succinic acid | | 0.5 | |
| Ferric oxide sulfate | | 0.1 | |
| Sodium citrate | | | 3.0 | to B having been added substantially 1.0 cc. of a 20% solution cobalt chloride and to each of A, B, and C having been added substantially 1,000 cc. distilled water; bringing each of Mediums A, B and C, each containing its stated additaments, to substantially pH 8.5 by the addition thereto of a substantially 10% aqueous solution of sodium carbonate-sodium hydroxide; collecting bacteria, including at least one species of the group consisting of *Vibrio ghinda* Pfeiffer, *V. percolans, Cellvibrio fulvus* and *Cellvibrio vulgaris* in raw water; adding about 2.0 mg. of the bacteria-containing water to Medium A and maintaining said medium at a temperature of substantially 34° C. for between 24 and 40 hours until substantially all bacteria except the Vibrio bacteria is killed; adding substantially 2 mg. of the resulting Vibrio-containing bacteria of Medium A to Medium B and maintaining said Medium B at a temperature of substantially 34° C. for substantially 24 hours whereby a pure culture of Vibrio of the above-named species is contained in said Medium B; adding about 2 mg. of the resulting pure culture of Vibrio of Medium B to Medium C and maintaining said Medium C at a temperature of substantially 34° C. for from 4 to 5 days; whereby colonies of said Vibrio multiply; preparing a mixture of substantially 4 tons of night soil in water; adding to said mixture about 4 grams of the resulting Vibrio from Medium C and allowing said Vibrio to remain in said mixture for substantially 45 days whereupon clarification of said water will be completed.

References Cited by the Examiner
UNITED STATES PATENTS 1,751,459  3/1930  Simmer _____ 210—11
2,867,521  1/1959  Jeffreys _____ 71—9 X

FOREIGN PATENTS 228,637  6/1960  Australia.

OTHER REFERENCES

Bergey's Manual of Determinative Bacteriology, sixth ed., Williams & Wilkins Co., Baltimore, 1948, p. 204.

Bergey's Manual of Determinative Bacteriology, seventh ed., W. & W. Co., 1957, pp. 18–20, 90, 229, 244, 251 and 252.

MORRIS O. WOLK, *Primary Examiner.*